(12) United States Patent
Gausman et al.

(10) Patent No.: US 11,055,342 B2
(45) Date of Patent: *Jul. 6, 2021

(54) SYSTEM AND METHOD FOR RICH MEDIA ANNOTATION

(71) Applicant: AT&T Intellectual Property I, L.P., Atlanta, GA (US)

(72) Inventors: Paul Gausman, Bridgewater, NJ (US); David C. Gibbon, Lincroft, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 205 days.

This patent is subject to a terminal disclaimer.

(21) Appl. No.: 16/186,956

(22) Filed: Nov. 12, 2018

(65) Prior Publication Data

US 2019/0079932 A1 Mar. 14, 2019

Related U.S. Application Data

(63) Continuation of application No. 12/177,638, filed on Jul. 22, 2008, now Pat. No. 10,127,231.

(51) Int. Cl.
*G06F 16/00* (2019.01)
*G06F 16/48* (2019.01)

(52) U.S. Cl.
CPC .................. *G06F 16/48* (2019.01)

(58) Field of Classification Search
CPC .... G06F 16/48; G06F 17/30038; G06F 17/30; G06F 17/241; G06F 17/30743; G06F 17/279; G06F 17/30194; G06F 17/30168; G06F 17/30011; G06F 17/30525; G06F 17/30598; G06G 16/00; G11B 27/036; H04N 21/435; H04N 21/8106; H04L 21/8106; H04L 65/4015; H04L 65/4014; G10L 13/08; G10L 13/04; G10L 13/10; G10L 15/063; G10L 21/0364
See application file for complete search history.

(56) References Cited

U.S. PATENT DOCUMENTS

| | | |
|---|---|---|
| 5,652,828 A | 7/1997 | Silverman |
| 5,732,216 A | 3/1998 | Logan |
| 5,749,908 A * | 5/1998 | Snell ..................... A61N 1/3702 607/30 |
| 6,014,649 A | 1/2000 | Kobayashi |

(Continued)

*Primary Examiner* — Anh Ly
(74) *Attorney, Agent, or Firm* — Guntin & Gust, PLC; Jay H. Anderson

(57) ABSTRACT

Disclosed herein are systems, methods, and computer readable-media for rich media annotation, the method comprising receiving a first recorded media content, receiving at least one audio annotation about the first recorded media, extracting metadata from the at least one of audio annotation, and associating all or part of the metadata with the first recorded media content. Additional data elements may also be associated with the first recorded media content. Where the audio annotation is a telephone conversation, the recorded media content may be captured via the telephone. The recorded media content, audio annotations, and/or metadata may be stored in a central repository which may be modifiable. Speech characteristics such as prosody may be analyzed to extract additional metadata. In one aspect, a specially trained grammar identifies and recognizes metadata.

20 Claims, 3 Drawing Sheets

(56) References Cited

U.S. PATENT DOCUMENTS

| | | | |
|---|---|---|---|
| 6,374,260 B1 * | 4/2002 | Hoffert | G10H 1/0058 |
| 6,415,248 B1 | 7/2002 | Bangalore | |
| 6,549,922 B1 | 4/2003 | Srivastava | |
| 6,889,321 B1 | 5/2005 | Kung | |
| 6,895,084 B1 | 5/2005 | Saylor | |
| 7,038,458 B1 | 5/2006 | Wiegert | |
| 7,162,691 B1 | 1/2007 | Chatterjee | |
| 7,457,397 B1 | 11/2008 | Saylor | |
| 7,469,283 B2 | 12/2008 | Eyal | |
| 7,730,132 B2 | 6/2010 | Ludwig | |
| 7,812,986 B2 | 10/2010 | Graham | |
| 7,818,215 B2 | 10/2010 | King | |
| 7,912,701 B1 | 3/2011 | Gray | |
| 8,447,144 B2 | 5/2013 | King | |
| 8,619,147 B2 | 12/2013 | King | |
| 9,558,735 B2 | 1/2017 | Roberts | |
| 2001/0042098 A1 | 11/2001 | Gupta | |
| 2002/0049595 A1 | 4/2002 | Bennett | |
| 2002/0069063 A1 | 6/2002 | Buchner | |
| 2002/0099737 A1 | 7/2002 | Porter | |
| 2002/0120928 A1 | 8/2002 | Wajs | |
| 2003/0001846 A1 | 1/2003 | Davis | |
| 2003/0023435 A1 | 1/2003 | Josephson | |
| 2003/0078780 A1 | 4/2003 | Kochanski | |
| 2003/0093790 A1 | 5/2003 | Logan | |
| 2004/0031058 A1 | 2/2004 | Reisman | |
| 2004/0236830 A1 | 11/2004 | Nelson | |
| 2004/0250201 A1 | 12/2004 | Caspi | |
| 2005/0055372 A1 * | 3/2005 | Springer, Jr. | G06F 16/907 |
| 2005/0081159 A1 | 4/2005 | Gupta | |
| 2005/0097451 A1 | 5/2005 | Cormack | |
| 2005/0182619 A1 * | 8/2005 | Azara | G06F 40/35 704/9 |
| 2005/0182625 A1 | 8/2005 | Azara | |
| 2005/0267758 A1 | 12/2005 | Shi | |
| 2006/0026204 A1 | 2/2006 | Campbell | |
| 2006/0026646 A1 | 2/2006 | Lou | |
| 2006/0053097 A1 | 3/2006 | King | |
| 2006/0056659 A1 | 3/2006 | Laurent | |
| 2006/0143559 A1 | 6/2006 | Spielberg | |
| 2006/0149558 A1 | 7/2006 | Kahn | |
| 2006/0197764 A1 * | 9/2006 | Yang | G06T 13/80 345/473 |
| 2006/0218191 A1 * | 9/2006 | Gopalakrishnan | G06F 16/41 |
| 2006/0235700 A1 | 10/2006 | Wong | |
| 2006/0242259 A1 | 10/2006 | Vallabh | |
| 2007/0112838 A1 * | 5/2007 | Bjarnestam | G06F 16/48 |
| 2007/0112839 A1 * | 5/2007 | Bjarnestam | G06F 16/48 |
| 2007/0266252 A1 | 11/2007 | Davis | |
| 2008/0103780 A1 | 5/2008 | Dacosta | |
| 2008/0155602 A1 | 6/2008 | Collet | |
| 2008/0201314 A1 | 8/2008 | Smith | |
| 2008/0270110 A1 * | 10/2008 | Yurick | G06F 16/685 704/3 |
| 2008/0270138 A1 * | 10/2008 | Knight | G06F 16/433 704/260 |
| 2008/0294679 A1 | 11/2008 | Gatterbauer | |
| 2009/0006082 A1 * | 1/2009 | Harris | G06F 16/68 704/201 |
| 2009/0044235 A1 * | 2/2009 | Davidson | H04N 21/4828 725/87 |
| 2009/0162818 A1 * | 6/2009 | Kosakowski | G09B 19/06 434/157 |
| 2009/0216743 A1 | 8/2009 | Coffman | |
| 2009/0216805 A1 | 8/2009 | Coffman | |
| 2009/0259623 A1 | 10/2009 | Mooneyham | |
| 2009/0271438 A1 | 10/2009 | Agapi | |
| 2009/0306985 A1 | 12/2009 | Roberts | |
| 2016/0203815 A1 | 7/2016 | Roberts | |
| 2017/0140748 A1 | 5/2017 | Roberts | |

* cited by examiner

SYSTEM AND METHOD FOR RICH MEDIA ANNOTATION

PRIORITY INFORMATION

The present application is a continuation of U.S. patent application Ser. No. 12/177,638, filed Jul. 22, 2008, the contents of which is incorporated herein by reference in its entirety.

BACKGROUND OF THE INVENTION

1. Field of the Invention

The present invention relates to media annotation and more specifically to user-generated audio annotations of media.

2. Introduction

Cameras, video and still photograph, are integrated into more and more consumer electronics gaining ubiquity in a matter of less than a decade. Video footage and still pictures are generated at an increasing rate. Video sharing sites like YouTube.com have exploded in popularity allowing users to post their own video creations for others to view and comment on. Consequently, a flood of footage is captured each day by millions of individuals across the country and the world. This information is largely unsearchable because insufficient metadata has been added to them to enable traditional search methods.

YouTube.com allows users to select categories and add tags to uploaded videos, but that can be a tedious process for many users. Such tags are only very rough separations into like groups. Often, less computer savvy users will forego adding more descriptive tags to their videos for many reasons, leaving the tags and categories with a less than optimal implementation because the descriptive tags are less than complete.

With cameras everywhere, newsworthy events, concerts, and similar events are recorded by multiple cameras by multiple individuals. A potential wealth of information and angles is available, but not usable because video clips are not uniformly tagged with metadata, if they are tagged at all. News agencies such as Fox News or CNN can search through clips of newsworthy events, but with great difficulty and expense. Forensic agencies can search through video clips for evidence in solving crimes, but with great difficulty and expense.

Accordingly, what is needed in the art is an easier, more convenient way for users to add metadata to videos and photos taken by digital cameras.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed herein are systems, methods, and computer readable-media for rich media annotation, the method comprising receiving a first recorded media content, receiving at least one audio annotation about the first recorded media, extracting metadata from the at least one of audio annotation, and associating all or part of the metadata with the first recorded media content. Additional data elements may also be associated with the first recorded media content. Where the audio annotation is a telephone conversation, the recorded media content may be captured via the telephone. The recorded media content, audio annotations, and/or metadata may be stored in a central repository which may be modifiable. Speech characteristics such as prosody may be analyzed to extract additional metadata. In one aspect, a specially trained grammar identifies and recognizes metadata.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
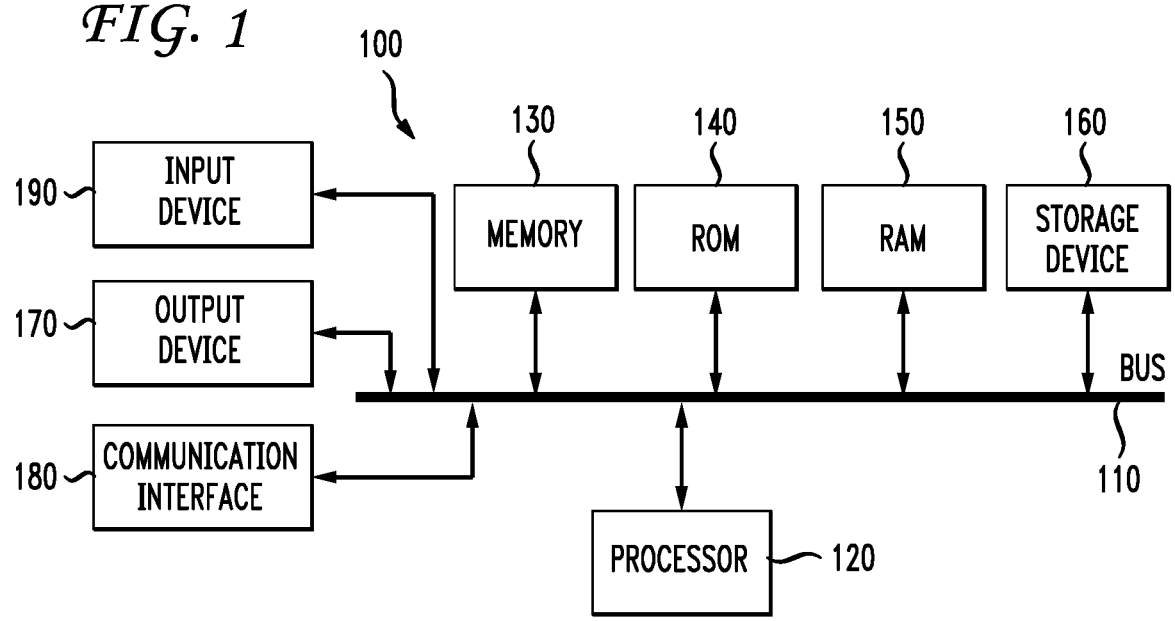
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
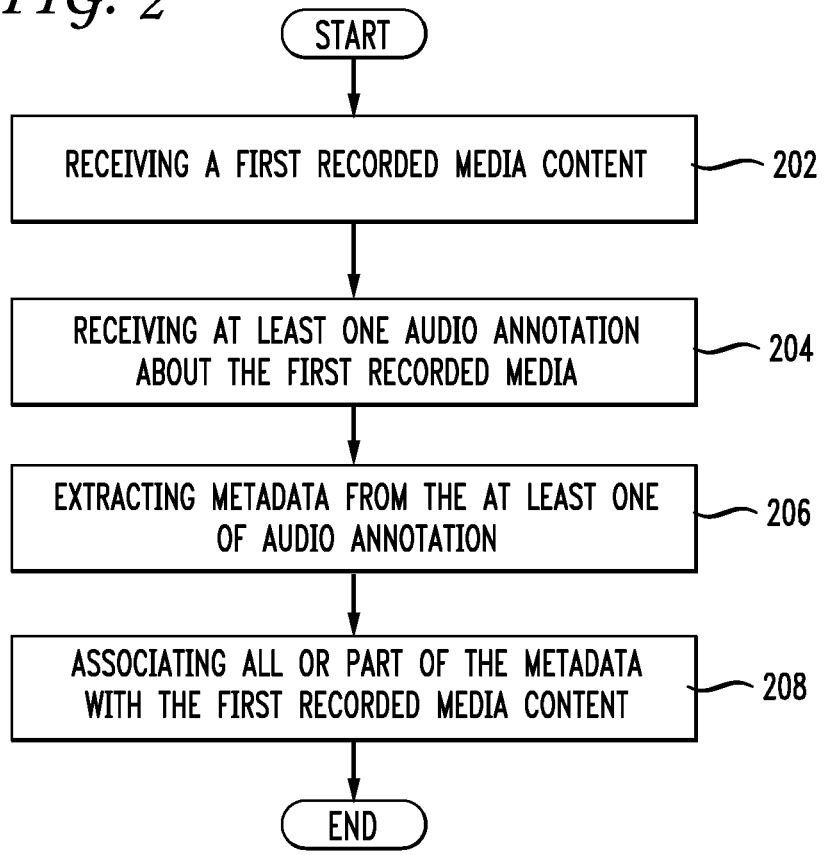
FIG. 2 illustrates an example method embodiment.

FIG. 2 illustrates an example method embodiment. First, the method receives a first piece of recorded media content 202. One example of the first media is user-generated video content created on a cellular phone, PDA, smart phone, webcam, etc. Along with the first media, additional associated data elements may be included, such as environmental data, camera information, GPS location, biometric ID, type of camera, F-stop, focal length, etc. Other additional data elements include user/customer profile data, account history, previously recorded annotations, and playlists.

Next, the method receives at least one audio annotation about the first recorded media. In one aspect, a user uploads a video from his cameraphone to YouTube and uses a computer microphone to record an audio annotation describing what's in the video, its significance, explaining the actions in the video, etc. On smartphones including a camera, the audio annotation could include a conversation between two individuals recorded by the smartphone as the video is shared between them.

Next, the method extracts metadata from the at least one of audio annotation 206. The most straightforward way to extract metadata is by speech recognition. Weights for metadata can be assigned based on speech recognition certainty. Weights can be used for aggregating multiple annotations of the same video clip to determine the most likely correct annotations. In addition to text that can be extracted from the audio annotation, general metadata information can be extracted by analyzing the audio for prosody elements such as tone, amplitude, pitch, and/or rate of speech, indicating feelings like alarm, anger, or excitement. Speech recognition may be performed by the device capturing the audio annotation itself, provided it is powerful enough, speech recognition may be performed by one or more remote servers after the device transmits the audio annotation, or a combination.

In one aspect, speech recognition is performed using a grammar specially trained to identify metadata, specifically parsing the speech to identify locations, individuals, and/or activities. A specially trained grammar may be further tuned on the fly based on tag popularity, the content of the recorded media, previous annotations, etc.

Next the method associates all or part of the metadata with the first recorded media content 208. In one aspect, the relevant or heavily weighted portions of the metadata extracted are associated with the content. Not all the words a user speaks in an audio annotation will be useful metadata; portions which describe the content in some meaningful way are generally desired as metadata. Metadata which is extracted and found useful may be stored in a central repository, along with the recorded media content and the original audio annotation. The repository is editable by the user. Many ownership schemes may be introduced for managing who can and who cannot edit or delete media content and annotations, but perhaps the most straightforward ownership scheme is to allow the original creator of the content full ownership. Ownership and the ability to modify media content, annotations, and the extracted metadata stored in a central repository is an issue when multiple users save annotations for the same media content. Further, media content in the central repository can be made accessible to third parties, such as CNN or other news agencies, for locating the best video of a public event for using on the air based on metadata extracted from the media annotations. In a central repository scenario where the original audio annotations are available, CNN or law enforcement could perform their own analysis of the audio annotations tuned to their own needs. For example, law enforcement may perform their own analysis using a grammar designed to pick up on street names of narcotics. CNN may perform an analysis using a grammar designed to find newsworthy events. In another embodiment, a user uploads a video clip to YouTube with an audio annotation and other users add their own audio annotations to the same video clip. Metadata for the video clip can be built from the aggregated collection of metadata extracted from the audio annotations.

In a further refinement, the central repository solicits additional metadata from a user about the recorded media. This user interface may be an Interactive Voice Response (IVR) system. The IVR prompts the user with dialogs designed to tease out more speech to extract metadata from. In one example, a user says a time and place, but not the date of the video. The IVR prompts the user "You didn't enter a date. When was this clip taken?" Soliciting additional metadata can be accomplished via an IVR or a fillable text form or some combination. In addition to soliciting further information, the IVR may ask for corrections or clarifications to audio annotations to correct potentially misunderstood data elements, acting similarly to a spellchecker, but for spoken annotations. Prompts to correct or clarify may be based on a confidence score of the speech recognition.

When metadata is extracted from the audio annotations, they may not always exactly match what other people have recorded in audio annotations. Metadata may be matched to predefined tags or normalized in some other way.

In one aspect, a user selects multiple video clip, photos, etc. to tag with a single audio annotation. The user may then add individual annotations on a per media basis. For example, a user selects all the pictures from a recent vacation and creates an audio annotation stating "This is our trip to Grandma's house in Alabama in February 2008." The user selects individual photos and adds further audio annotations such as "This is the tire swing I used when I was a child" or "Here's where Carol fell out of her chair". Third parties, like Grandma herself, may add voice annotations in addition to the voice annotations of the original content creator.

Audio annotations of multiple individuals may be adapted to act as a voting application or ratings system for gauging reactions to specific content, much like Nielsen Ratings. In the case of audio annotations for video content, voice annotations may be integrated into existing MPEG 7 data in the video in context by timing in the "script".

Figure 3:
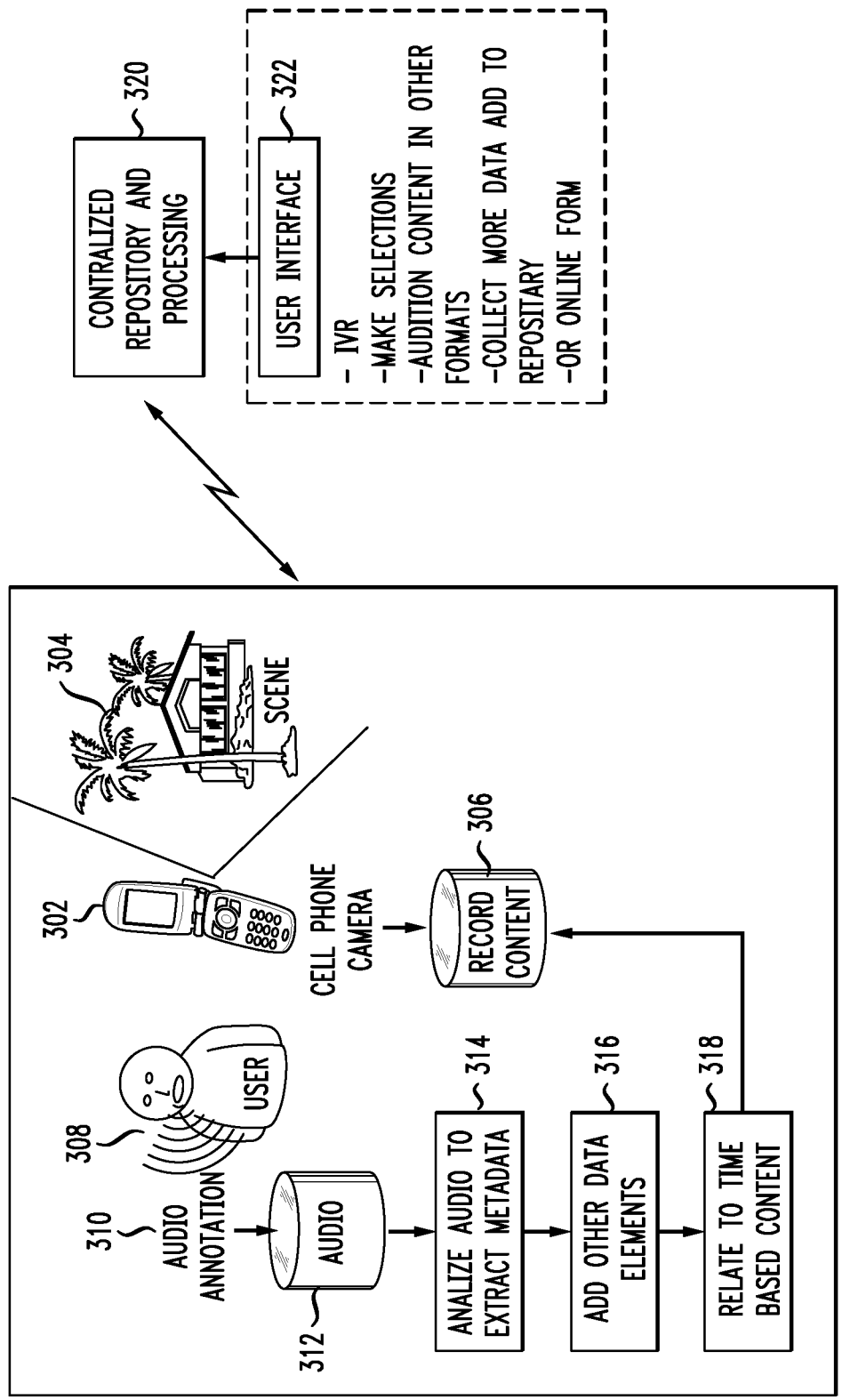
FIG. 3 illustrates an example system for rich media annotation.

FIG. 3 illustrates an example system for rich media annotation. In this example, a cell phone camera 302 captures a video clip of a scene 304. The video clip is stored in a recorded content database 306. The user 308 who took the video clip (or any other user) adds an audio annotation 310 describing the video clip which is stored in an audio annotation database 312. The audio annotations are analyzed to extract metadata 314. Further non-spoken data elements are added to the metadata 316, such as the timestamp of the video clip, GPS location of the camera, orientation of the camera, shutter speed, biometric information, user account information, telephone number, etc. If the metadata extracted from the audio annotations is time-specific, it can be related to the video clip based on time 318.

When the metadata is extracted and gathered, it is transmitted to the centralized repository and processing module 320. The repository may do additional processing based on a custom grammar or other needs. The user interface 322 with the central repository allows the user to edit, modify, or delete video clips, audio annotations, and extracted metadata. The user interface may be a web page, a computer software application, an IVR, or any other suitable interface. In one aspect, the user interface allows for multiple users to view others' video clips and add or edit their own annotations in addition to the original video clip author's annotations.

Figure 4:
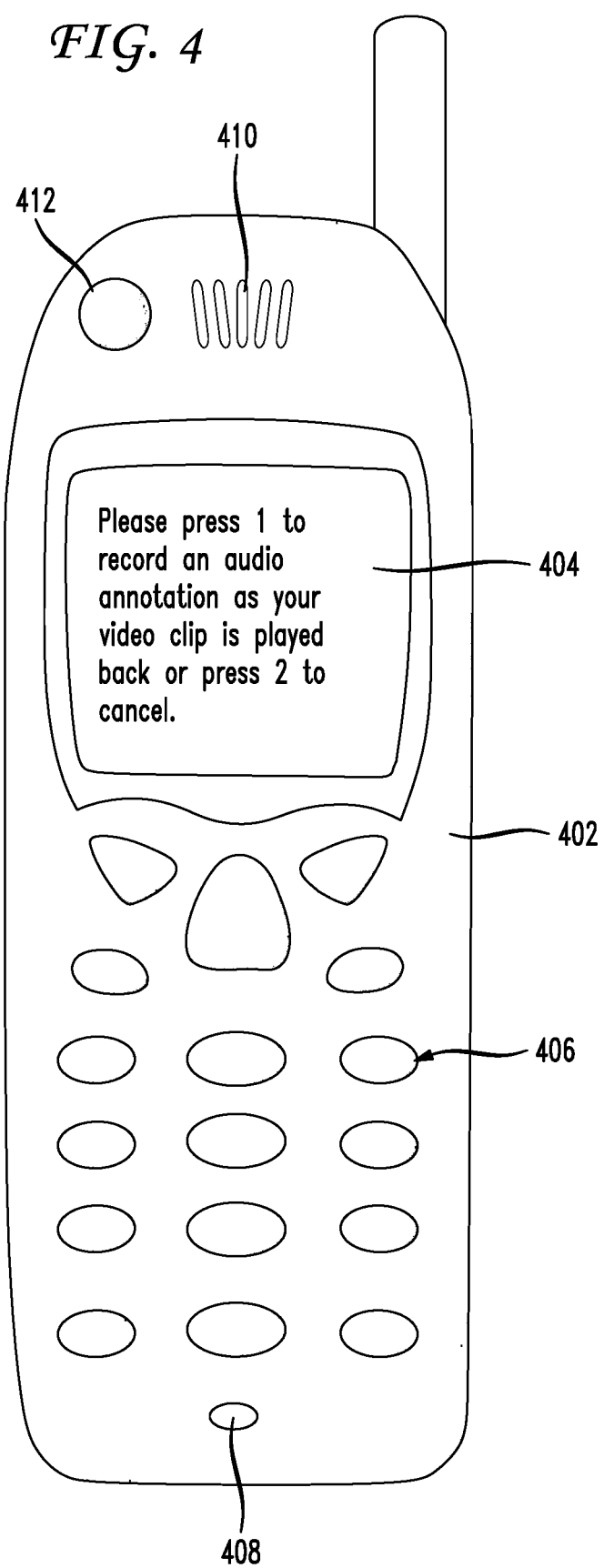
FIG. 4 illustrates an exemplary cell phone embodiment for gathering rich media annotations.

FIG. 4 illustrates an exemplary smart cellular phone embodiment for gathering rich media annotations. The smart phone 402 contains a video display 404 capable of displaying text. The user interacts with the cellular phone via a keypad 406. In this case the display is prompting the user to record an audio annotation on the display, but a speaker 408 may be used to audibly prompt the user to record an audio annotation. The video clip was taken by a lens in the camera 410. While the lens is shown as attached to the camera in this case, an external camera may also be used. The smart phone includes a microphone 412 for capturing the audio annotations. The smart phone may store and process the audio annotation itself, or it may stream or otherwise transmit the audio annotation to a centralized repository as shown in FIG. 3.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the processes described herein may have application in online collections of user-generated media content, such as YouTube. Those skilled in the art will readily recognize various modifications and changes that may be made to the present invention without following the example embodiments and applications illustrated and described herein, and without departing from the true spirit and scope of the present invention.

We claim:

1. A method comprising:
generating, by a processing system including a processor, text from an audio annotation of first media content using a grammar;
parsing, by the processing system, the text to identify first metadata indicative of one of more of a location, an individual or an activity;
storing, by the processing system, the first media content, the audio annotation and the first metadata at a storage device, wherein a user interface coupled to the storage device enables a user to modify one or more of the first media content, the audio annotation and the first metadata;
based on weights assigned to the first metadata, identifying, by the processing system, second media content having an associated weighted second metadata corresponding to the first metadata; and
generating, by the processing system, at least one descriptive annotation for the first media content based on the first metadata and the second metadata.

2. The method of claim 1, further comprising:
receiving, by the processing system, additional metadata via a dialog with a user who recorded the first media content.

3. The method of claim 2, further comprising:
annotating, by the processing system, the first media content using the at least one descriptive annotation and the additional metadata to yield annotated first media content.

4. The method of claim 3, further comprising:
providing, by the processing system, the annotated first media content to a user device.

5. The method of claim 1, wherein additional data elements are also associated with the first media content.

6. The method of claim 1, wherein the audio annotation is a telephone conversation and the first media content is captured via a telephone.

7. The method of claim 1, wherein one of the first media content, the audio annotation, and the text are stored in a central repository.

8. The method of claim 7, wherein the audio annotation and the text stored in the central repository are modifiable.

9. The method of claim 8, wherein the central repository solicits additional text from a user about the first media content.

10. A system comprising:
a processing system including a processor; and
a computer-readable storage medium having instructions stored therein which, when executed by the processing system, cause performance of operations comprising:
generating text from an audio annotation of first media content using a grammar;
parsing the text to identify first metadata indicative of one or more of a location, an individual or an activity;
storing the first media content, the audio annotation and the first metadata at a storage device, wherein a user interface coupled to the storage device enables a user to modify one or more of the first media content, the audio annotation and the first metadata;
based on weights assigned to the first metadata, identifying second media content having an associated weighted second metadata corresponding to the first metadata; and
generating at least one descriptive annotation for the first media content based on the first metadata and the second metadata.

11. The system of claim 10, wherein the operations further comprise:
receiving additional metadata via a dialog with a user who recorded the first media content.

12. The system of claim 11, wherein the operations further comprise:
annotating the first media content using the at least one descriptive annotation and the additional metadata to yield annotated first media content.

13. The system of claim 12, wherein the operations further comprise:
providing the annotated first media content to user devices.

14. The system of claim 10, wherein additional data elements are also associated with the first media content.

15. The system of claim 10, wherein the audio annotation is a telephone conversation and the first media content is captured via a telephone.

16. The system of claim 10, wherein one of the first media content, the audio annotation, and the text are stored in a central repository.

17. The system of claim 16, wherein the audio annotation and the text stored in the central repository are modifiable.

18. The system of claim 17, wherein the central repository solicits additional text from a user about the first media content.

19. A non-transitory computer-readable storage device having instructions which, when executed by a computing device, cause the computing device to perform operations comprising:
generating text from an audio annotation of first media content using a grammar;
parsing the text to identify first metadata indicative of one or more of a location, an individual or an activity;
storing the first media content, the audio annotation and the first metadata at a storage device, wherein a user interface coupled to the storage device enables a user to modify one or more of the first media content, the audio annotation and the first metadata;
based on weights assigned to the first metadata, identifying second media content having an associated weighted second metadata corresponding to the first metadata; and
generating at least one descriptive annotation for the first media content based on the first metadata and the second metadata.

20. The non-transitory computer-readable storage device of claim 19, wherein the operations further comprise:
receiving additional metadata via a dialog with a user who recorded the first media content.

* * * * *